US011167513B2

United States Patent
Marchini et al.

(10) Patent No.: US 11,167,513 B2
(45) Date of Patent: Nov. 9, 2021

(54) METHOD OF CONTROLLING THE MANAGEMENT OF ANNULAR ANCHORING STRUCTURES IN A PROCESS AND A PLANT FOR BUILDING TYRES FOR VEHICLE WHEELS

(71) Applicant: Pirelli Tyre S.p.A., Milan (IT)

(72) Inventors: Maurizio Marchini, Milan (IT); Gianni Mancini, Milan (IT); Andrea D'Ambrosio, Milan (IT); Stefano Balia, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 0 days.

(21) Appl. No.: 16/731,853

(22) Filed: Dec. 31, 2019

(65) Prior Publication Data

US 2020/0130301 A1    Apr. 30, 2020

Related U.S. Application Data

(62) Division of application No. 15/157,673, filed on May 18, 2016, now Pat. No. 10,549,495, which is a
(Continued)

(30) Foreign Application Priority Data

Nov. 12, 2010    (IT) .......................... MI2010A002093

(51) Int. Cl.
*B29D 30/00* (2006.01)
*B29D 30/24* (2006.01)

(52) U.S. Cl.
CPC ....... *B29D 30/0016* (2013.01); *B29D 30/244* (2013.01); *B29D 2030/0044* (2013.01)

(58) Field of Classification Search
CPC .............. B29C 30/0016; B29D 30/244; B29D 2030/0044
See application file for complete search history.

(56) References Cited

U.S. PATENT DOCUMENTS 3,700,526 A    10/1972    Brey et al.
4,443,290 A    4/1984     Loeffler et al.
(Continued)

FOREIGN PATENT DOCUMENTS

CN    101084106    7/2012
CN    101657323    3/2013
(Continued)

OTHER PUBLICATIONS

Chinese Office Action, Application No. 201180054155.8 dated Jan. 4, 2015.
(Continued)

*Primary Examiner* — Yung-Sheng M Tsui
(74) *Attorney, Agent, or Firm* — Finnegan, Henderson, Farabow, Garrett & Dunner LLP

(57) ABSTRACT

A plant for building a tyre for a vehicle wheel includes a device for building carcass sleeves on building drums, a bead-forming machine, a first storage region, a second storage region, a first transport device movable between a picking-up position of pairs of annular anchoring structures in the first storage region and a release position of the pairs of annular anchoring structures in the bead-forming machine, and a second transport device movable between a first engagement position in the first storage region and a second engagement position in the second storage region, to move a plurality of annular anchoring structures between the first storage region and the second storage region.

27 Claims, 4 Drawing Sheets

Related U.S. Application Data division of application No. 13/883,170, filed as application No. PCT/IB2011/054709 on Oct. 21, 2011, now Pat. No. 9,365,005.

(60) Provisional application No. 61/416,127, filed on Nov. 22, 2010.

(56) References Cited

U.S. PATENT DOCUMENTS

| | | | |
|---|---|---|---|
| 5,632,836 A | 5/1997 | Verschoor et al. | |
| 6,328,835 B1* | 12/2001 | Kobayashi | B29D 30/0016 156/111 |
| 6,995,752 B2 | 2/2006 | Lu | |
| 2007/0215265 A1 | 9/2007 | Sata | |
| 2007/0272345 A1* | 11/2007 | Sawada | B29D 30/48 156/131 |
| 2010/0043947 A1 | 2/2010 | Janszen | |

FOREIGN PATENT DOCUMENTS

| | | | |
|---|---|---|---|
| DE | 102006051540 | 5/2008 | |
| EP | 0983839 | 12/2003 | |
| EP | 1724100 | 11/2006 | |
| JP | H2-025321 | 1/1990 | |
| JP | 2000-071351 | 3/2000 | |
| WO | WO-2001032409 A1 * | 5/2001 | |
| WO | WO 2006/064524 | 6/2006 | |
| WO | WO 2008/129363 | 10/2008 | |
| WO | WO 2010/064066 | 6/2010 | |
| WO | WO 2010/070374 | 6/2010 | |
| WO | WO-2010070374 A1 * | 6/2010 | ............. B29D 30/20 |

OTHER PUBLICATIONS

Notice of Reasons for Rejection dated Nov. 4, 2015, in counterpart Japanese Patent Application No. 2013-538296.
International Search Report from the European Patent Office for International Application No. PCT/IB2011/054709, dated Apr. 2, 2012.
Written Opinion of the International Searching Authority from the European Patent Office for International Application PCT/IB2011/054709, dated Apr. 2, 2012.
Notice of Preliminary Rejection dated Oct. 31, 2017, by the Korean Intellectual Property Office in corresponding Korean Application No. 10-2013-7011230.
Notice of Preliminary Rejection dated May 31, 2018, by the Korean Intellectual Property Office in corresponding Korean Application No. 10-2013-7011230.

* cited by examiner

METHOD OF CONTROLLING THE MANAGEMENT OF ANNULAR ANCHORING STRUCTURES IN A PROCESS AND A PLANT FOR BUILDING TYRES FOR VEHICLE WHEELS

CROSS REFERENCE TO RELATED APPLICATIONS

This application is a continuation application of U.S. patent application Ser. No. 15/157,673, filed May 18, 2016 (now U.S. Pat. No. 10,549,495, which issued on Feb. 4, 2020), which is a divisional application of U.S. application Ser. No. 13/883,170, filed May 2, 2013 (now U.S. Pat. No. 9,365,005, which issued on Jun. 14, 2016), which is a national phase application based on PCT/IB2011/054709, filed Oct. 21, 2011, which claims the benefit of priority of Italian Patent Application No. MI2010A002093, filed Nov. 12, 2010, and U.S. Provisional Application No. 61/416,127, filed Nov. 22, 2010; the contents of each of which are fully incorporated herein by reference.

The present invention relates to a method of controlling the management of annular anchoring structures in a process and a plant for building tyres for vehicle wheels.

A tyre for vehicle wheels generally comprises a carcass structure including at least one carcass ply having respectively opposite end flaps in engagement with respective annular anchoring structures, integrated into the regions usually identified as "beads", having an inner diameter substantially corresponding to a so-called "fitting diameter" of the tyre on a respective mounting rim.

In the present specification and in the following claims by "annular anchoring structure" it is intended a tyre element comprising a bead core. Preferably this component comprises a bead core and a filling insert. More preferably this component comprises a bead core and a filling insert both enclosed by an edge.

Document WO 2010/70374 in the name of the same Applicant describes a plant and a process for building green tyres for vehicle wheels. The process comprises the steps of: building a carcass structure on a first forming drum in at least one carcass-structure building line including a plurality of work stations disposed in a sequential series, in which the carcass structure comprises at least one carcass ply and a pair of annular anchoring structures; building a crown structure on at least one second building drum in at least one crown-structure building line comprising a plurality of work stations disposed in a sequential series, in which the crown structure comprises at least one belt structure; shaping said carcass structure into a toroidal conformation assembling it to said crown structure in at least one shaping and assembling station. The carcass-structure building line comprises a work station for applying a pair of the aforesaid annular anchoring structures to the opposite axial ends of the carcass ply/plies and can further be provided with devices for turning up the ends of the carcass ply/plies on the carcass ply itself so as to form loops containing the annular anchoring structures.

Document U.S. Pat. No. 3,700,526 discloses an automatic machine for producing green tyres. The machine comprises a plurality of interconnected and dependent stations in which specialised operations are carried out by mechanical devices acting in sequence. The machine comprises a plurality of building drums continuously moving between horizontal stationary tables, at which winding of material on the drums occurs, while said drums are being moved across the table on which the material is positioned. The drums with the wound material are sent to and positioned on turrets for receiving the bead cores and tread band that are subsequently unloaded from the collapsed drums for storage. At least one pair of racks capable of horizontally storing the bead cores are positioned close to the turret. A transfer arm is associated with each rack for moving the bead cores on the turret and means is provided for bringing the bead cores horizontally arranged on the rack into engagement with the transfer arm.

The Applicant has verified that in modern tyre-producing plants, production of a plurality of tyre batches is increasingly more required, each batch having a limited number of tyres with different technical features. This request depends on the market requirements as the market continuously evolves and needs specific tyres for each car and/or motorcycle (production differentiation), in particular for high-end vehicles, and the tyre performances are required to keep up with the increase of the motor vehicles and motorcycles' performances. In addition, production of a plurality of batches consisting of a limited number of tyres meets the requirements of sports contests.

Within the field of automatic plants for tyre building, of the type described in WO 2010/70374, the Applicant has perceived the necessity to increase flexibility of said plants so as to make it possible to quickly change the type of tyre produced from a batch to the following one.

In greater detail, the Applicant has perceived the importance of managing (storing, moving, etc.) the constituent elements of a tyre that are pre-assembled in work stations physically separated from the building lines of a plant of the aforesaid type and only subsequently fed to the plant itself.

More particularly, among said pre-assembled elements, the Applicant has perceived the necessity to simultaneously manage an important number of types of annular anchoring structures intended for tyres having different sizes.

Therefore the Applicant intends to provide a method and a plant that, during building and assembling of the tyre components, are capable of ensuring flexible management of the annular anchoring structures. In particular, the Applicant intends to provide a method and a plant allowing different types of annular anchoring structures to be managed, so that the size of the tyres to be produced may be changed with ease and quickness without the presence of idle time between the production of a batch and that of the following one.

The Applicant has found that by arranging two lines for storage and transport of the annular anchoring structures, preferably in side by side relationship with each other, close to a bead-forming machine belonging to a carcass-structure building line, it is possible while a tyre batch is being produced, to prepare the annular anchoring structures intended for the following batch.

More specifically, in a first aspect, the present invention relates to a method of controlling the management of annular anchoring structures in a plant for building tyres for vehicle wheels, comprising:

a) feeding pairs of first annular anchoring structures from a first storage region to a bead-forming machine;
b) loading a plurality of second annular anchoring structures into a second storage region;
c) carrying the second annular anchoring structures from the second storage region to the first storage region;
d) feeding pairs of second annular anchoring structures from the first storage region to the bead-forming machine.

The Applicant has verified that by use of said method it is possible to manage annular anchoring structures different in size (fitting) or in the type of the various elements (bead core, filling insert, etc.) for each tyre batch under production during a given workshift. In this manner the technological flexibility is increased while the production capacity of the building plant is maintained substantially constant.

In a second aspect, the present invention relates to a plant for building tyres for vehicle wheels, comprising:
a device for building carcass sleeves on building drums;
a bead-forming machine;
a first storage region;
a second storage region;
a first transport device movable between a picking-up position of pairs of annular anchoring structures in the first storage region and a release position of said pairs of annular anchoring structures in the bead-forming machine;
a second transport device movable between a first engagement position in the first storage region and a second engagement position in the second storage region, to move a plurality of annular anchoring structures between the first storage region and the second storage region and vice versa.

The present invention, in at least one of the aforesaid aspects, can further have one or more of the preferred features hereinafter described.

Preferably, in a preferred embodiment it comprises:
e) loading a plurality of first annular anchoring structures into said second storage region;
f) carrying the first annular anchoring structures from the second storage region to the first storage region.

More preferably the sequential cyclic repetition of actions a) to f) is included.

Preferably, said action b) takes place during transport of the first annular anchoring structures to said bead-forming machine.

Preferably, said action f) takes place during transport of the second annular anchoring structures to said bead-forming machine.

The Applicant has found that during production of a first tyre batch, the operator has sufficient time to start preparation of the annular anchoring structures (with different sizes or different structure) intended for the following batch by manually arranging them in the second storage region, so that they are ready for being automatically picked up when they are required for production of said following batch.

Preferably, the second annular anchoring structures are carried from the second storage region to the first storage region by shifting baskets each containing a plurality of said second annular anchoring structures.

Preferably, the first annular anchoring structures are carried from the second storage region to the first storage region through shifting of baskets each containing a plurality of said first annular anchoring structures.

Shifting of groups of annular anchoring structures contained in baskets appears to be quick and simple.

Preferably, action b) comprises: bringing the second annular anchoring structures to a loading location of the second storage region.

Preferably, action e) comprises: bringing the first annular anchoring structures to a loading location of the second storage region.

Loading of the annular anchoring structures takes place at a predetermined point without being it necessary to bring said structures to different positions of the second storage region.

Preferably, the first annular anchoring structures or the second annular anchoring structures are loaded into a basket placed in the loading location.

The annular anchoring structures are manually loaded in the loading location and the operator has all the time required for loading them, picking them up from a container in which they are horizontally disposed upon each other and taking them to the loading location.

In a preferred embodiment, provision is made for: moving the first annular anchoring structures or the second annular anchoring structures from the loading location to storage locations of the second storage region.

Once loaded at the loading location, the annular anchoring structures are moved to other locations of the same second storage region waiting for their subsequent use.

Preferably, the first annular anchoring structures or the second annular anchoring structures are moved from the loading location to storage locations of the second storage region through shifting of baskets each containing a plurality of said first annular anchoring structures or second annular anchoring structures, respectively.

Also during this movement, shifting of groups of annular anchoring structures contained in baskets appears to be quick and simple.

According to a preferred embodiment, provision is made for: moving the first annular anchoring structures or the second annular anchoring structures from the loading location directly to the first storage region.

If there are free areas in the first storage region, once the first annular anchoring structures are loaded at the loading location, they are moved directly thereinto, waiting for their following use.

Preferably, the first annular anchoring structures or the second annular anchoring structures are moved from the loading location directly to the first storage region by shifting baskets each containing a plurality of said first annular anchoring structures or second annular anchoring structures, respectively.

Also during this movement, shifting of groups of annular anchoring structures contained in baskets appears to be quick and simple.

Shifting of the baskets takes place in a clever manner depending on the free space in the two storage regions, acting in such a manner that: in the first region there is always the presence of at least one basket containing the correct annular anchoring structures for production of the tyre batch in progress; the first and/or second region contain baskets having the correct annular anchoring structures for production of the following tyre batch; and the empty baskets reach the loading location for being filled.

According to a preferred embodiment, it is provided for:
building first carcass sleeves of a first tyre batch on building drums, wherein each first carcass sleeve includes at least one carcass ply;
feeding said building drums with the first carcass sleeves in succession to said bead-forming machine.

Preferably, it is provided for:
fitting said pairs of first annular anchoring structures on each first carcass sleeve, forming pairs of beads.

More preferably, it is provided for:
moving away, in succession, each building drum with said first carcass sleeve provided with pairs of beads, from the bead-forming machine.

More preferably, action c) takes place during formation of each pair of beads on each first carcass sleeve.

According to a preferred embodiment, it is provided for:
building second carcass sleeves of a second tyre batch on building drums, wherein each second carcass sleeve comprises at least one carcass ply;

feeding the building drums with the second carcass sleeves in succession to the bead-forming machine.

Preferably, provision is made for:

fitting said pairs of second annular anchoring structures on each second carcass sleeve, forming pairs of beads.

More preferably, provision is made for:

moving away, in succession, each building drum with said second carcass sleeve provided with pairs of beads, from the bead-forming machine.

Preferably, the empty baskets are shifted from the first storage region to the second storage region.

Production of the following batch starts immediately after the end of the preceding batch production, because the plant is already programmed for carrying out production of the carcass sleeves of the following batch with the related specifications on the building drums, and the previously prepared correct annular anchoring structures are already available in the first storage region.

According to a preferred embodiment, a plurality of baskets is provided that can be housed in the first storage region and in the second storage region, wherein the baskets are each able to hold a plurality of annular anchoring structures.

According to a different embodiment, a third movable transport device is provided between the building device and the bead-forming machine, for taking the building drums with the carcass sleeves devoid of annular anchoring structures from the building device to the bead-forming machine and for moving the building drums with the carcass sleeves provided with pairs of annular anchoring structures away from the bead-forming machine.

Preferably, the first transport device is interposed between the bead-forming machine and the first storage region.

Preferably, the second transport device is interposed between the first storage region and the second storage region.

Preferably, the third transport device is interposed between the bead-forming machine and the first transport device.

Due to this arrangement, a free region disposed in side by side relationship with the second storage region can be obtained in which the operator can move and work for loading the annular anchoring structures of the subsequent batch picking them up from the suitable containers in which they are stored upon each other. This arrangement further allows a region in side by side relationship with the bead-forming machine (lying on the opposite side relative to the first storage region) to be left free for access by the operator should possible servicing or interventions be required, or merely, for visual and touch control of the correct formation of the beads (quality monitoring).

Preferably, the first storage region extends in a horizontal direction.

More preferably, the first storage region comprises a plurality of first storage locations disposed in mutual side by side relationship along said horizontal direction and each adapted to receive a basket.

Preferably, the first storage region comprises a plurality of second storage locations superposed on the first storage location. The first storage region is defined by a frame of simple structure, easy access and cheap.

In a preferred embodiment, the first transport device comprises:

a first guide extending in side by side relationship with, and parallel to the first storage region;

a first truck;

at least one first arm for picking up annular anchoring structures, which is mounted on the first truck and is movable between the first storage region and the bead-forming machine.

By sliding along the first guide, moving vertically, moving close to or away from the first storage region and close to or away from the bead-forming machine, the first transport device easily reaches all baskets stored in said first storage region and is also able to bring the annular anchoring structures picked up from said baskets, onto the bead-forming machine.

Preferably, the second storage region substantially extends parallel to the first storage region.

Preferably, the second storage region comprises a plurality of third storage locations disposed in mutual side by side relationship with each other and parallel to said horizontal direction and each adapted to receive a basket.

Preferably, the second storage region comprises a plurality of fourth storage locations superposed on the third storage locations.

The second storage region has a structure similar to or identical with that of the first storage region.

Preferably, the second storage region comprises a loading location accessible by an operator and adapted to receive one of said plurality of baskets to be filled with the annular anchoring structures.

The operator must only move between the containers for the annular anchoring structures and the loading location because the following basket-shifting operations are managed by the plant.

Preferably, the second transport device comprises:

a second guide extending in side by side relationship with, and parallel to the second storage region and put between said first storage region and second storage region;

a second truck slidable on said second guide;

at least one second arm for picking up one of said plurality of baskets, which is mounted on the second truck and is movable between the second storage region and first storage region.

By sliding along the second guide, moving vertically, moving close to or away from the first storage region and close to or away from the second storage region, the second transport device easily reaches all stored baskets and is able to shift them between one storage region and the other.

Preferably, the third transport device comprises:

a third guide substantially extending in side by side relationship with, and parallel to the first guide, put between said first guide and the bead-forming machine and extending as far as the building device;

at least one support for the building drum slidable on the third guide.

Preferably, the third transport device comprises a first support and a second support for respective building drums.

Preferably, the first transport device comprises a third arm for picking up a building drum from the first support and laying it down in the bead-forming machine and for laying down a building drum picked up from the bead-forming machine on the second support.

The first transport device performs several functions, i.e. it unloads a building drum provided with carcass sleeve on which the beads have already been formed by the bead-forming machine, loads a subsequent drum provided with carcass sleeve but without beads, into the bead-forming machine and brings the annular anchoring structures intended for the subsequent drum into the bead-forming machine.

Further features and advantages will become more apparent from the detailed description of a preferred but not exclusive embodiment of a method of controlling the management of annular anchoring structures and a plant for building tyres for vehicle wheels, in accordance with the present invention.

BRIEF DESCRIPTION OF THE DRAWINGS

This description will be set out hereinafter with reference to the accompanying drawings, given by way of non-limiting example, in which.

With reference to the drawings, a plant for building tyres 2 in accordance with the present invention has been generally denoted at 1.

Figure 3:
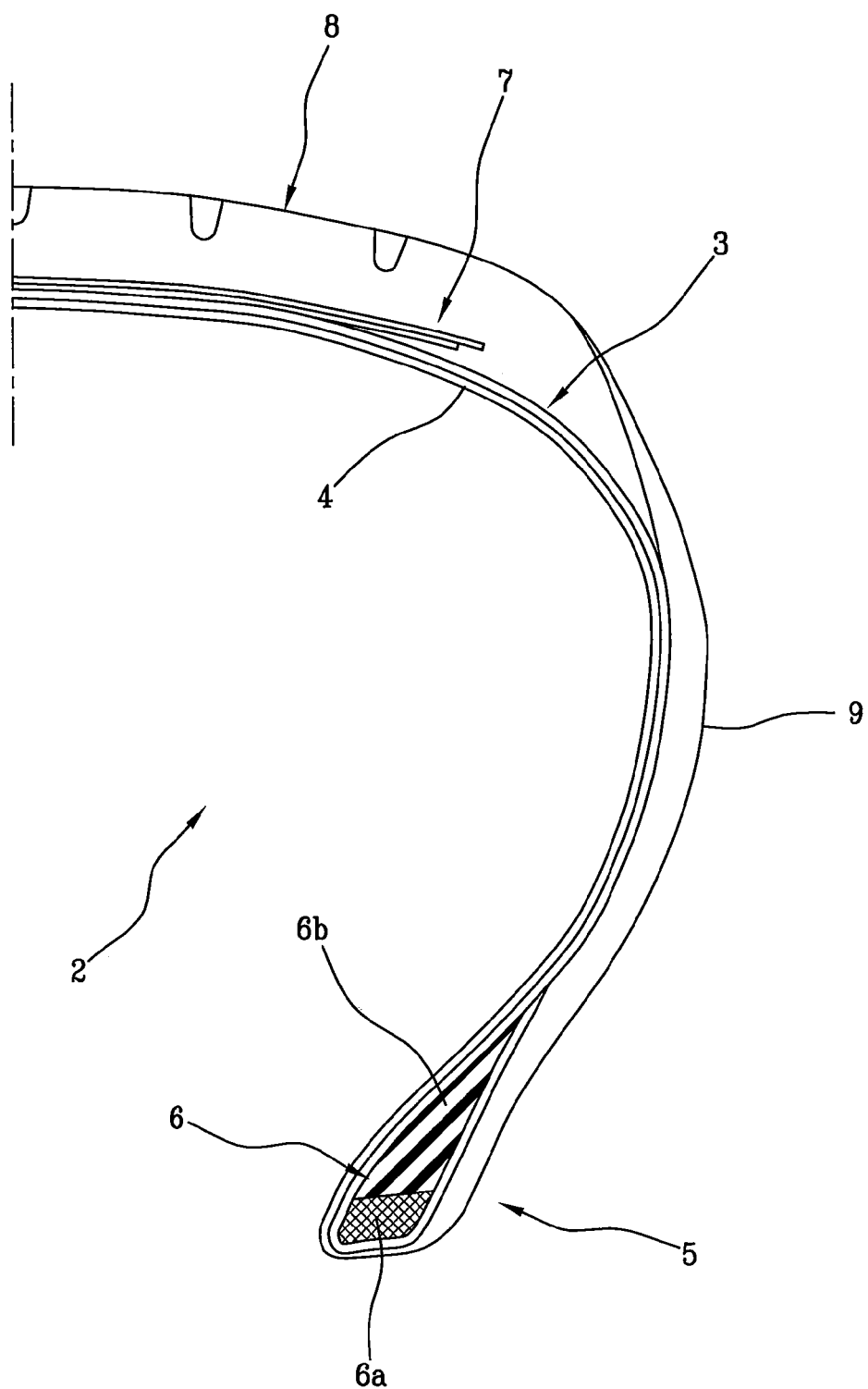
FIG. 3 diagrammatically shows a diametrical section of a tyre for vehicle wheels obtained by means of the plant seen in FIG. 1.

Plant 1 is designed for manufacturing tyres 2 (FIG. 3) essentially comprising at least one carcass ply 3 preferably internally coated with a layer of airtight elastomeric material, or a so-called liner 4, two so-called "beads" 5 integrating respective annular anchoring structures 6 including respective bead cores 6a possibly associated with elastomeric fillers 6b and in engagement with the circumferential edges of the carcass ply 3, a belt structure 7 applied at a radially external position to the carcass ply 3, a tread band 8 applied at a radially external position to the belt structure 7, in a so-called crown region of tyre 2, and two sidewalls 9 applied to the carcass ply at laterally opposite positions, each at a side region of tyre 2, extending from the corresponding bead 5 to the corresponding side edge of the tread band 8.

Plant 1 preferably comprises a carcass-structure building line 10, in which a carcass structure including at least one of the carcass plies 3 and the annular anchoring structures 6 is formed on a building drum 11.

The carcass-structure building line 10 comprises a device 12 for building carcass sleeves on the building drums 11.

The building device 12 comprises a plurality of stations 13. For instance, a first station 13 forms liner 5, preferably through winding of a continuous elongated element of elastomeric material into mutually adjacent and/or at least partly overlapped coils and distributed along the forming surface of the first forming drum 11. In at least one second station 13 of the building device 12 manufacture of one or more carcass plies 4 can be carried out, said plies being preferably obtained by laying strip-like elements obtained by cutting to size a continuous strip of elastomeric material including textile or metallic cords disposed adjacent and parallel to each other, on the building drum 11, in a circumferentially approached relationship.

The carcass-structure building line 10 further comprises a station 14 dedicated to integrating the annular anchoring structures 6 into said at least one carcass ply 4, through application of the annular anchoring structures 6 themselves at an axially external position to the flaps of said at least one carcass ply 4 pulled down in the direction of the rotation axis of said building drum 11, which flaps are subsequently turned up around the annular anchoring structures 6.

Downstream of station 14 for integrating the annular anchoring structures 6, further work stations 13 can be present, for making at least one portion of an abrasion-proof element or the sidewalls 9, for example.

Figure 1:
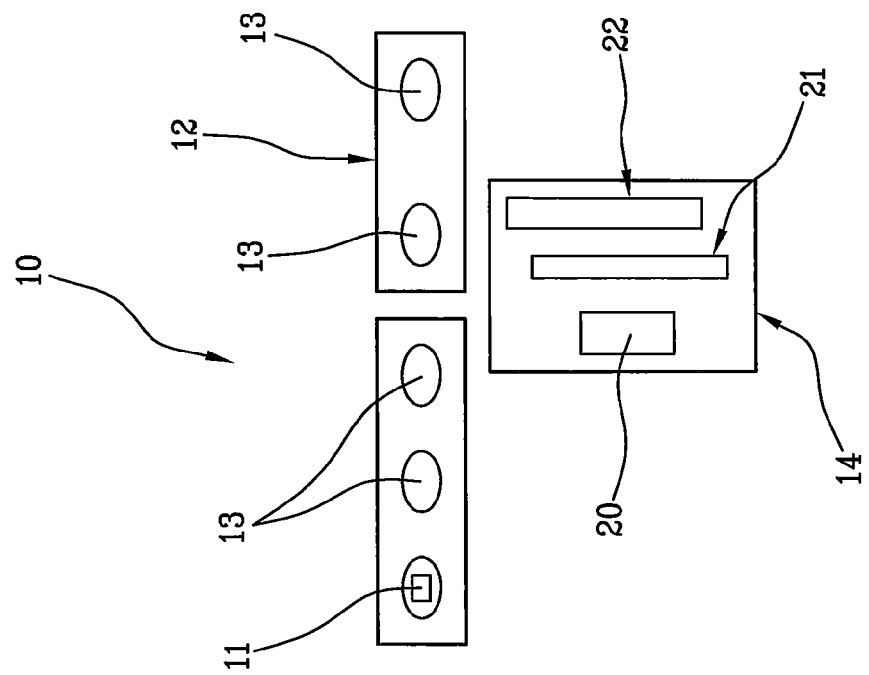
FIG. 1 diagrammatically shows a top view of a plant for building tyres in accordance with the present invention.
Figure 1:
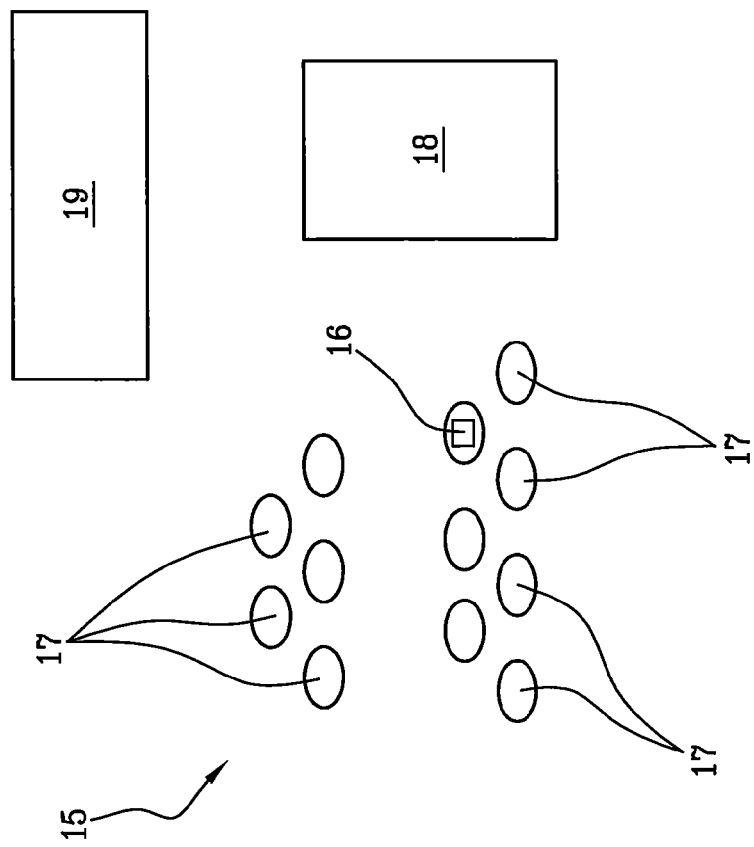

Plant 1 further comprises a crown-structure building line 15 in which a crown structure comprising at least the belt structure 7 and preferably the tread band 8 too, is formed on a forming drum 16. Indicated in FIG. 1 is a plurality of work stations 17 belonging to the aforesaid line 15 for crown-structure building and each of them is dedicated to formation of at least one portion of a tyre component on the second forming drum 16. The forming drum 16 is sequentially transferred from one station to the following one through suitable devices, not shown.

At least one building station 17 can be dedicated to manufacture of the belt structure 7, preferably obtained either by laying down strip-like elements formed by cutting to size a continuous strip of elastomeric material including preferably metallic cords disposed parallel to each other, in circumferentially approached relationship and according to a suitable deposition angle relative to a plane perpendicular to the rotation axis of the forming drum 16; and/or by winding at least one rubberised textile or metallic reinforcing cord into coils disposed axially adjacent to each other in parallel to said plane perpendicular to the rotation axis of the forming drum 16. By way of example, a work station 17 is preferably provided for manufacturing the tread band 8 and/or the sidewalls 9. Tread band 8 and sidewalls 9 are preferably obtained by winding of at least one continuous elongated element of elastomeric material into coils disposed adjacent to each other and/or at least partly overlapped.

Plant 1 is further provided with an assembling and shaping station 18 operatively associated with the carcass-structure building line 15 and the crown-structure building line. In the assembling and shaping station 18, the carcass structure is shaped into a toroidal conformation and associated with the crown structure, so as to obtain a green tyre.

The green tyres built by the plant are sequentially transferred to a curing line 19, from which moulded and cured tyres 2 are obtained.

Station 14 dedicated to integration of the annular anchoring structures 6 comprises a bead-forming machine 20, of the type described in WO 2010/064066 for example, in the name of the Applicant, a first storage region 21 and a second storage region 22 for said annular anchoring structures 6.

Figure 5:
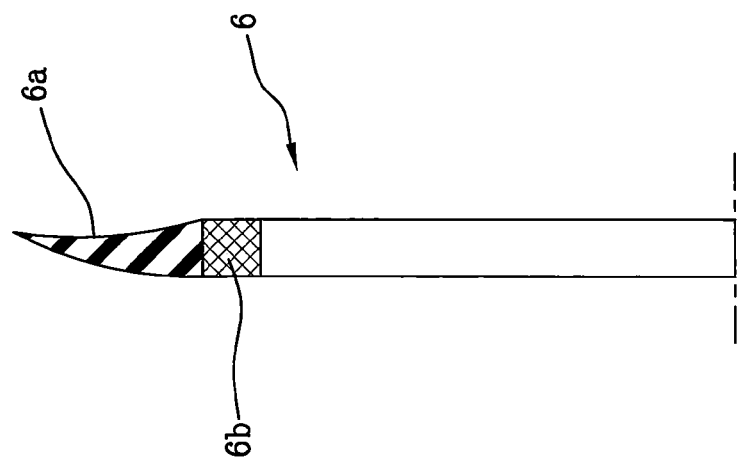
FIG. 5 is a radial section of the annular anchoring structure of FIG. 4.
Figure 4:
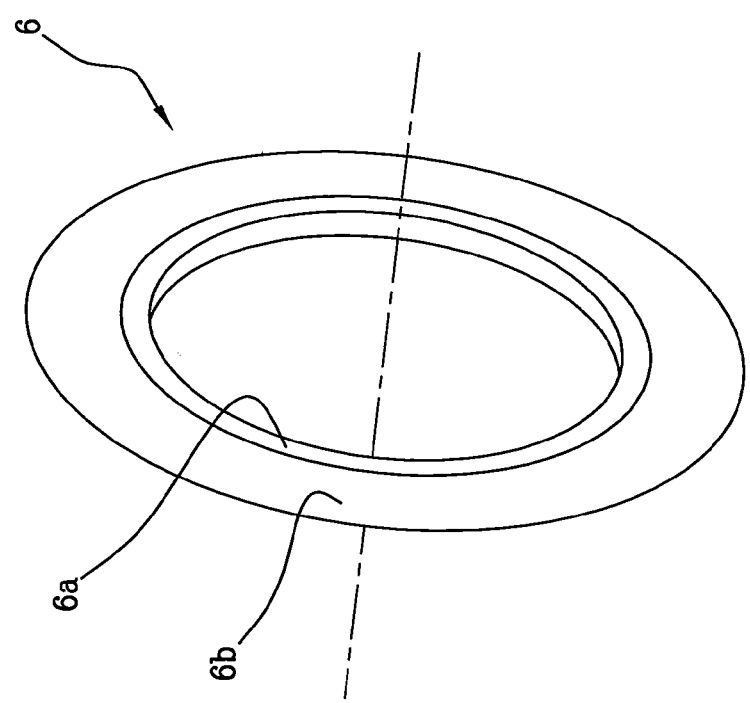
FIG. 4 shows an annular anchoring structure being part of the tyre in FIG. 3.

In the embodiment shown, each annular anchoring structure 6 is formed with a bead core 6a including metal wires and an elastomeric portion 6b disposed at a radially external position around the bead core 6a (FIGS. 4 and 5).

The station 14 for integration of the annular anchoring structures 6 further comprises a plurality of baskets 23, in each of them a plurality of said annular anchoring structures 6 being housed. By way of example, each basket holds some dozens of annular anchoring structures 6. Each basket 23, not shown and described in detail, has a plurality of compartments of vertical major extension in each of which a single annular anchoring structure 6 is housed and disposed in a substantially vertical plane. The annular anchoring structures 6 disposed in a basket 23 therefore lie in respective planes disposed in side by side relationship with each other and substantially vertical.

The first storage region 21 is preferably defined by a frame, not shown in detail, mainly extending along a horizontal straight direction "X-X". The frame accommodates at least one row of baskets 23 in side by side relationship (FIG. 2) and each of them is placed in a respective first storage location 21*a* of the first storage region 21. In a preferred embodiment, the frame is a two-level frame and the baskets 23 can be disposed in two superposed rows. Each row for instance comprises 10 to 20 baskets 23. Therefore the first storage region comprises a plurality of second storage locations superposed on the first storage locations 21*a*. By way of example, the frame can consist of a latticework.

Figure 2:
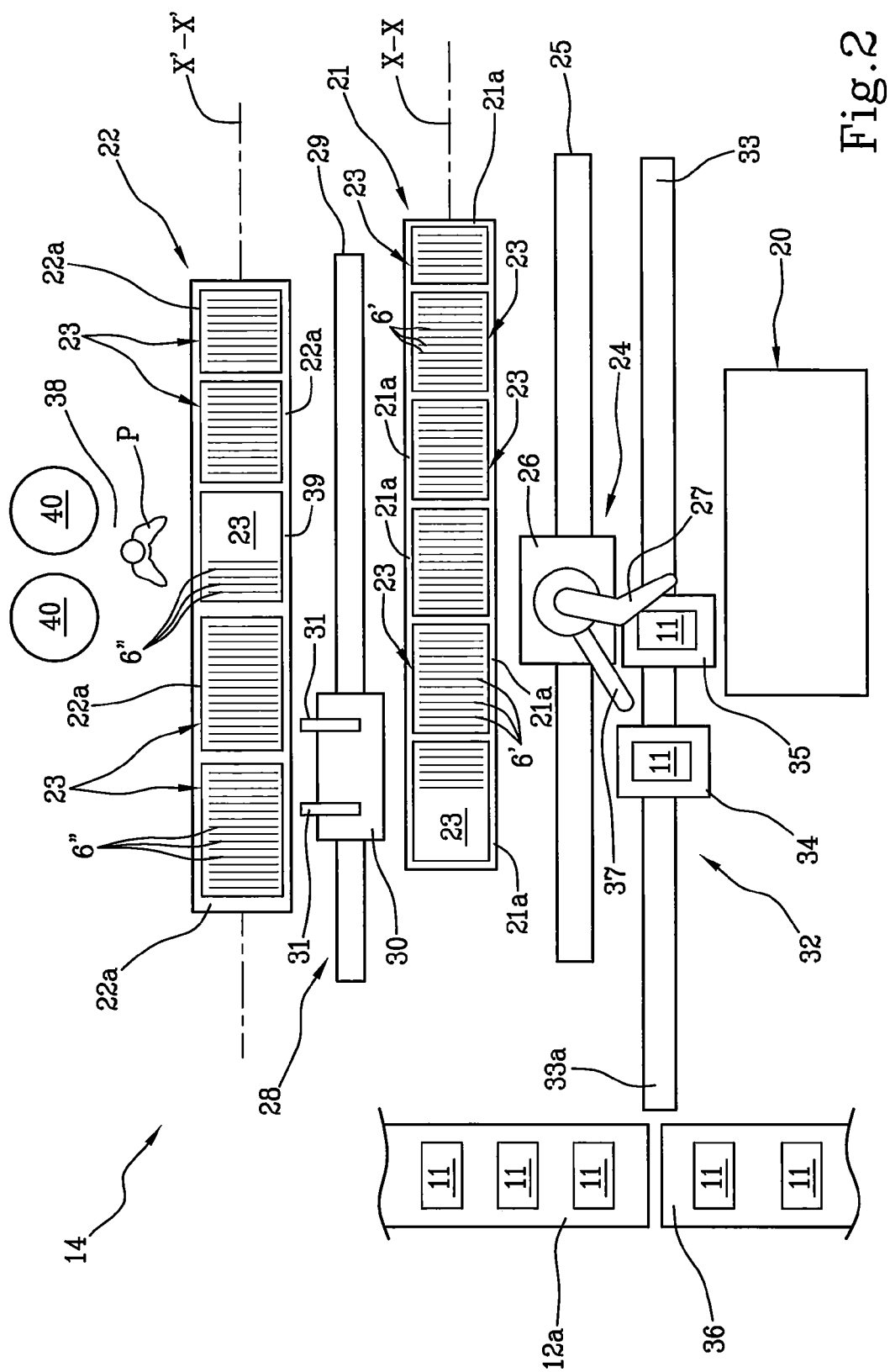
FIG. 2 shows a portion of the plant in FIG. 1 in detail.

The second storage region 22 too is preferably defined by a frame mainly extending along said horizontal straight direction "X-X" and accommodating at least one row of baskets 23 in side by side relationship with each other, in respective third storage locations 22*a* (FIG. 2). In a preferred embodiment, the frame is a two-level frame and the baskets 23 can be disposed in two superposed rows. Each row for instance comprises 10 to 20 baskets 23. The second storage region 22 therefore comprises a plurality of fourth storage locations superposed on the third storage locations 22*a*. By way of example this frame too can consist of a latticework.

In a preferred embodiment, the frames of the first 21 and second 22 storage regions are of similar structures.

The frame of the first storage region 21 is interposed between the frame of the second storage region 22 and the bead-forming machine 20.

A first transport device 24 comprising a first straight guide 25 extending parallel to said frame of the first storage region 21 is placed between the frame of the first storage region 21 and the bead-forming machine 20. Slidably installed on the first guide 25 is a first truck 26 carrying a first arm 27. The first arm 27, preferably an anthropomorphic robot arm, has a pair of pliers capable of manipulating or handling two annular anchoring structures 6. The first arm 27 installed on the first truck 26, driven by a suitable control unit, is able to spatially move and bring the pliers close to each point of the first storage region 21 and close to the bead-forming machine 20. The first arm 27 is therefore movable between a position for picking up pairs of annular anchoring structures 6 placed in baskets 23 of the first storage region 21 and a position for releasing said pairs of annular anchoring structures 6 into the bead-forming machine 20.

A second transport device 28 is placed between the two parallel frames of the first 21 and second 22 storage regions and it comprises a second straight guide 29 extending parallel to both said frames. Slidably installed on the second guide 29 is a second truck 30 carrying a pair of second arms 31. The two second arms 31 are parallel to each other and perpendicular to said horizontal straight direction "X-X", i.e. to the second guide 29. The two second arms 31 move together, relative to the second truck 30, along a direction parallel to their longitudinal extension and a vertical direction.

The second truck 30, driven by said control unit, is able to bring the second arms 31 close to each basket 23 positioned in the first storage region 21 or in the second storage region 22. The second arms 31, still driven by said control unit, are movable on the second truck 30 between a position at which they extend towards the first storage region 21 for engaging and picking up a basket 23 stowed therein or stowing a basket 23 picked up from the second storage region 22 or the first storage region 21 itself, and a position at which they extend towards the second storage region 22, for engaging and picking up a basket 23 stowed therein or stowing a basket 23 picked up from the first storage region 21 or the second storage region 22 itself.

A third transport device 32 comprising a third straight guide 33 extending parallel to the first straight guide is placed between the bead-forming machine 20 and the first transport device 24. Slidably movable on the third guide 33 is a first support 34 and a second support 35, each capable of carrying a building drum 11. The third guide 33 extends from the bead-forming machine 20 to the carcass-sleeve building device 12. In greater detail, one end 33*a* of said third guide 33 is close to an unloading region 12*a* of the building device 12 at which the building drums 11 provided with the carcass sleeve but still devoid of the annular anchoring structures 6 arrive. The same end 33*a* of the third guide 33 is also near a picking-up region 36 for the building drums 11 coming from the bead-forming machine 20 (therefore provided with the carcass sleeve and the annular anchoring structures 6) and intended for subsequent working operations.

The first truck 26 further carries a third arm 37 provided with suitable hooking mechanisms adapted to manipulate the building drums 11 one at a time. The third arm 37 is able to pick up a building drum 11 lying in the bead-forming machine 20 and provided with the carcass sleeve and the annular anchoring structures 6 and lay it on the first support 34 or the second support 35. The third arm 37 is further able to pick up a building drum 11 lying on the first support 34 or the second support 35 and provided with the carcass sleeve but not yet with the annular anchoring structures 6 and lay it in the bead-forming machine 20.

The station 14 for integration of the annular anchoring structures 6 further comprises a region 38 for an operator "P", disposed in side by side relationship with the second storage region 22 and on the opposite side of said second storage region 22 relative to the second transport device 28. The operator "P" has access from such a region 38 to a loading location 39 being part of the second storage region 22 that in the attached FIG. 2 is interposed between two storage locations 22*a*. In the region 38 for the operator "P" containers 40 can be placed in which the annular anchoring structures 6 are disposed horizontally upon each other.

During operation, plant 1 (FIG. 2) puts into practice the method of the present invention. The building drums 11 of a first tyre batch to be built coming from the building device 12 and each provided with a first carcass sleeve are fed to the end 33*a* of the third guide 33, in succession. A handling device, not shown, picks up a building drum 11 from the unloading region 12*a* of the building device 12 and places it on the first support 34 and then picks up a building drum 11 coming from the bead-forming machine 20 from the second support 35 and places it in the picking-up region 36. The first support 34 and second support 35 translate on the third guide 33 until the bead-forming machine 20.

In the first storage region 21 baskets 23 are present which contain first annular anchoring structures 6 having the correct features for mounting on the first carcass sleeves of the first tyre batch being produced.

The third arm 37 unloads a building drum 11 provided with a first carcass sleeve and the annular anchoring structures 6 from the bead-forming machine 20 and places it on the second support 35. Subsequently, the third arm 37 picks up said building drum 11 without annular anchoring structures 6 from the first support 34 and loads it up in the bead-forming machine 20. The first arm 27 picks up a pair of first annular anchoring structures 6 from one of baskets 23 and places them on a loading device of the bead-forming machine 20 of the type disclosed in WO 2010/064066, for example. While the bead-forming machine 20 is fitting the first annular anchoring structures 6 on opposite ends of the first carcass sleeve and is turning up each of the end flaps of the same sleeve around each first annular anchoring structure 6, the first support 34 and second support 35 translate on the third guide 33 until the end 33*a* of the third guide 33 for loading another first building drum 11 on the first support 34 and unloading the drum carried by the second support 35. During repetition of the just described cycle for production of the first batch, the operator "P" manually picks up second annular anchoring structures 6 intended for a subsequent tyre batch from the containers 40 and manually loads them into the basket 23 positioned in the loading location 39.

When (partial or full) loading of basket 23 placed in the loading location 39 has been completed, the second transport device 28 picks it up and takes it to one of the storage locations 22a of the second storage region 22 or directly to one of the storage location 21a of the first storage region 21.

As baskets 23 containing the first annular anchoring structures 6 intended for the first batch are cleared, the second transport device 28 brings the empty baskets from the first storage region 21 to the second storage region 22 and brings the filled baskets 23 of the second annular anchoring structures 6 intended for the second tyre batch into the first storage region 21.

When production of all tyres of the first batch has been completed, production of the second batch can immediately begin because the second annular anchoring structures 6 are already within reach of the first arm 27. The building drums 11 of the second tyre batch coming from the building device 12 and provided each with a second carcass sleeve are fed towards the end 33a of the third guide 33 in succession and the second annular anchoring structures 6 are loaded in the bead-forming machine 20.

Meanwhile, the operator "P" can prepare third annular anchoring structures 6 intended for a third batch, loading them into the loading location 39. The above disclosed method goes on until each tyre batch designed for the current workshift has been completed.

The invention claimed is:

1. A plant for building a tyre for a vehicle wheel, comprising:
    a device configured for building carcass sleeves on building drums;
    a bead-forming machine;
    a first storage region;
    a second storage region;
    a first transport device movable between a picking-up position of pairs of annular anchoring structures in the first storage region and a release position of said pairs of annular anchoring structures in the bead-forming machine;
    a second transport device movable between a first engagement position in the first storage region and a second engagement position in the second storage region, to move a plurality of annular anchoring structures between the first storage region and the second storage region, and vice versa;
    wherein the first transport device and the second transport device are each capable of transporting first annular anchoring structures and second annular anchoring structures;
    wherein the second annular anchoring structures are structurally different from the first annular anchoring structures; and
    wherein the plant is configured to simultaneously manage the first annular anchoring structures and the second annular anchoring structures.

2. The plant as claimed in claim 1, comprising a plurality of baskets that can be housed in the first storage region and in the second storage region, wherein each of said baskets is able to hold a plurality of annular anchoring structures.

3. The plant as claimed in claim 2, comprising a third transport device that is movable between the building device and the bead-forming machine to bring the building drums with the carcass sleeves devoid of annular anchoring structures from the building device to the bead-forming machine and move the building drums with the carcass sleeves provided with pairs of annular anchoring structures away from the bead-forming machine.

4. The plant as claimed in claim 3, wherein the first transport device is interposed between the bead-forming machine and the first storage region.

5. The plant as claimed in claim 4, wherein the second transport device is interposed between the first storage region and the second storage region.

6. The plant as claimed in claim 5, wherein the third transport device is interposed between the bead-forming machine and the first transport device.

7. The plant as claimed in claim 6, wherein the first storage region extends in a horizontal direction.

8. The plant as claimed in claim 7, wherein the first storage region comprises a plurality of first storage locations disposed in mutual side by side relationship along said horizontal direction and each first storage region is adapted to receive a basket.

9. The plant as claimed in claim 8, wherein the first storage region comprises a plurality of second storage locations superposed on the first storage location.

10. The plant as claimed in claim 9, wherein the first transport device comprises:
    a first guide extending in side by side relationship with, and parallel to the first storage region;
    a first truck;
    at least one first arm configured for picking up annular anchoring structures, said at least one first arm being mounted on the first truck and is movable between the first storage region and the bead-forming machine.

11. The plant as claimed in claim 10, wherein the second storage region substantially extends parallel to the first storage region.

12. The plant as claimed in claim 2, wherein the first storage region extends in a horizontal direction, and wherein the second storage region comprises a plurality of third storage locations disposed in mutual side by side relationship with each other and parallel to said horizontal direction and each second storage region is adapted to receive a basket.

13. The plant as claimed in claim 12, wherein the second storage region comprises a plurality of fourth storage locations superposed on the third storage locations.

14. The plant as claimed in claim 13, wherein the second storage region comprises a loading location accessible by an operator and adapted to receive one of said plurality of baskets.

15. The plant as claimed in claim 11, wherein the second transport device comprises:
    a second guide extending in side by side relationship with, and parallel to the second storage region and put between said first storage region and second storage region;
    a second truck slidable on said second guide;
    at least one second arm configured for picking up one of said plurality of baskets that is mounted on the second truck and is movable between the second storage region and first storage region.

16. The plant as claimed in claim 10, wherein the third transport device comprises:

a third guide substantially extending in side by side relationship with, and parallel to the first guide, put between said first guide and the bead-forming machine and extending as far as the building device; and at least one building drum support slidable on the third guide.

17. The plant as claimed in claim 16, wherein the third transport device comprises a first building drum support and a second building drum support.

18. The plant as claimed in claim 17, wherein the first transport device further comprises a third arm configured for picking up a building drum from the first building drum support and laying said building drum down in the bead-forming machine and configured for laying down a building drum picked up from the bead-forming machine on the second building drum support.

19. The plant as claimed in claim 2, wherein the first storage region extends in a horizontal direction, and wherein the first storage region comprises a plurality of first storage locations disposed in mutual side by side relationship along said horizontal direction and each first storage region is adapted to receive a basket.

20. The plant as claimed in claim 19, wherein the first storage region comprises a plurality of second storage locations superposed on the first storage location.

21. The plant as claimed in claim 7, wherein the second storage region comprises a plurality of third storage locations disposed in mutual side by side relationship with each other and parallel to said horizontal direction and each second storage region is adapted to receive a basket.

22. The plant as claimed in claim 21, wherein the second storage region comprises a plurality of fourth storage locations superposed on the third storage locations.

23. The plant as claimed in claim 21, wherein the second storage region comprises a loading location accessible by an operator and adapted to receive one of said plurality of baskets.

24. The plant as claimed in claim 2, wherein the second transport device comprises:
a second guide extending in side by side relationship with, and parallel to the second storage region and put between said first storage region and second storage region;
a second truck slidable on said second guide;
at least one second arm configured for picking up one of said plurality of baskets that is mounted on the second truck and is movable between the second storage region and first storage region.

25. The plant as claimed in claim 3, wherein the third transport device comprises:
a third guide substantially extending in side by side relationship with, and parallel to the first guide, put between said first guide and the bead-forming machine and extending as far as the building device; and at least one building drum support slidable on the third guide.

26. The plant as claimed in claim 25, wherein the third transport device comprises a first building drum support and a second building drum support.

27. The plant as claimed in claim 15, wherein the first transport device further comprises a third arm configured for picking up a building drum from the first building drum support and laying said building drum down in the bead-forming machine and configured for laying down a building drum picked up from the bead-forming machine on the second building drum support.

* * * * *